United States Patent
Kais et al.

(10) Patent No.: US 6,177,205 B1
(45) Date of Patent: Jan. 23, 2001

(54) PROCESS FOR PRODUCING A PERMANENT WAY COMPONENT AND SUCH A COMPONENT

(75) Inventors: Alfred Kais, Lich; Gerhard Ratz, Langgöns; Walter Kunitz, Wildau, all of (DE)

(73) Assignee: BWG Butzbacher Weichenbau GmbH, Butzbach (DE)

( * ) Notice: Under 35 U.S.C. 154(b), the term of this patent shall be extended for 0 days.

(21) Appl. No.: 09/180,275
(22) PCT Filed: May 22, 1997
(86) PCT No.: PCT/EP97/02614
§ 371 Date: Nov. 6, 1998
§ 102(e) Date: Nov. 6, 1998
(87) PCT Pub. No.: WO97/45562
PCT Pub. Date: Dec. 4, 1997

(30) Foreign Application Priority Data

May 24, 1996 (DE) .............................. 196 21 017

(51) Int. Cl.$^7$ ................. E01B 7/12; C21D 9/04
(52) U.S. Cl. .................. 428/683; 428/679; 228/262.42; 148/525; 148/529; 246/468; 246/471
(58) Field of Search .................... 428/683, 679; 228/262.42; 148/525, 529; 246/468, 471

(56) References Cited

U.S. PATENT DOCUMENTS

| | | |
|---|---|---|
| 1,032,578 | * 7/1912 | Alden . |
| 3,480,072 | * 11/1969 | Heim et al. . |
| 3,865,639 | * 2/1975 | Bellot et al. . |
| 4,104,504 | * 8/1978 | Ridenour et al. . |
| 4,144,442 | * 3/1979 | Augustin et al. . |
| 4,514,235 | * 4/1985 | Augustin et al. . |
| 4,724,890 | * 2/1988 | Moser et al. . |
| 5,082,214 | * 1/1992 | Testart . |
| 5,170,932 | * 12/1992 | Blumauer . |
| 5,482,576 | * 1/1996 | Heller et al. . |

FOREIGN PATENT DOCUMENTS

| | | |
|---|---|---|
| 649591 | 5/1985 | (CH) . |
| 2952079 | 4/1983 | (DE) . |
| 2846930 | 2/1984 | (DE) . |
| 263482 | 1/1989 | (DE) . |
| 0507762A2 | * 3/1992 | (EP) . |
| 0602729A1 | * 12/1992 | (EP) . |
| 1533739 | * 6/1968 | (FR) . |

* cited by examiner

Primary Examiner—Deborah Jones
Assistant Examiner—Jennifer McNeil
(74) Attorney, Agent, or Firm—Dennison, Scheiner, Schultz & Wakeman

(57) ABSTRACT

A process for manufacture of a railroad track part, in particular a large points part, with rail parts such as a frog point and connecting rails, and the track part obtained. The track part is made of materials of differing composition, one of which is a carbon steel and one of which is an austenitic manganese steel, which are connected by welding and are subsequently subjected to a joint heat treatment. To permit joining of the materials without negative effects on their properties, the parts are joined directly by electron beam welding or indirectly via an intermediate layer comprising a nickel-based alloy, the joined parts then being heated to a temperature T and held over a time t such that for the austenitic manganese steel, solution annealing takes place, and for the carbon steel, austenitizing takes place. The railroad track part is partially quenched after the holding time t at temperature T, such that the austenitic manganese steel is provided in an sustenitic structure and the carbon steel is in a mixed structure with at least bainite and pearlite contents.

18 Claims, 1 Drawing Sheet

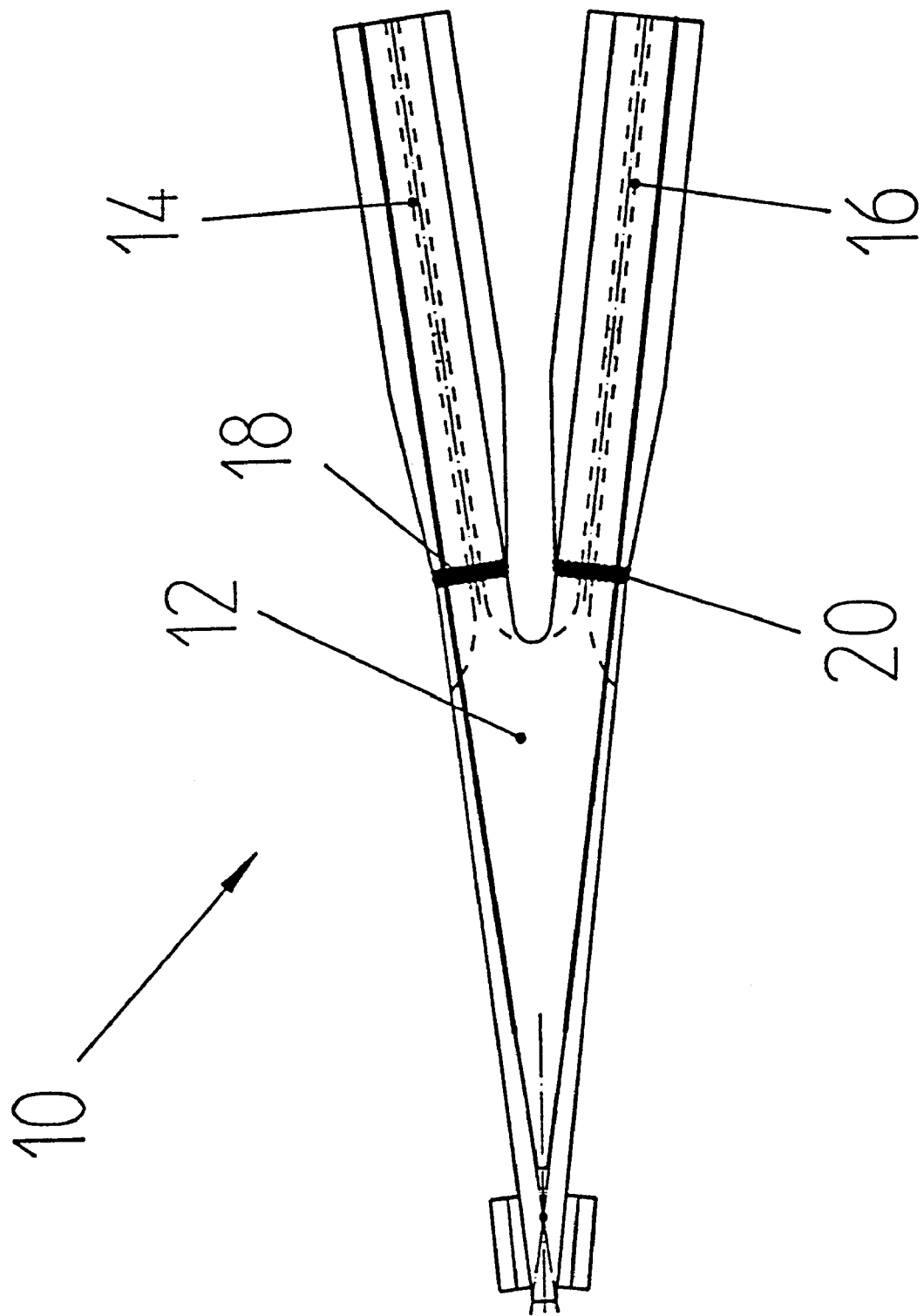

PROCESS FOR PRODUCING A PERMANENT WAY COMPONENT AND SUCH A COMPONENT

BACKGROUND OF THE INVENTION

The invention relates to a process for manufacture of a railroad track part, in particular of a large points part, where rail parts such as a frog point and connector rail comprise a first and a second material of differing composition.

The invention further relates to a railroad track part, in particular to a large points part, comprising rail parts of differing materials joined by welding, of which materials one is carbon steel and another austenitic manganese steel.

A frog with block-like frog point is known from DE-AS 1 284 439, where the pointed part comprises self-hardening steel and the connecting rails standard rail grade steel. The pointed part and connecting rails are oil-quenched after welding.

Also known is the joining of a frog point made of austenitic manganese steel to connecting rails of carbon steel via an intermediate layer of a low-carbon austenitic steel. After making the first welded join, homogenizing follows. Consequently, to join cast austenitic manganese steel to carbon steel, an intermediate layer made of steel is used, where during welding a specified sequence must be maintained and after the first welding operation a heat treatment must be performed, without this however assuring in the final analysis that any harmful influences are ruled out during the second welding operation on the intermediate layer made of special steel. Furthermore, the intermediate layer must have a certain length in order to attain a thermal separation between the welding points.

A process for manufacture of a frog is known from AT 401 359 B, where a frog point is, before being welded to connecting rails, subjected to a selective heat treatment in order to achieve a fine-lamellar pearlite structure.

DD 263 482 A5 relates to a process for the manufacture of points frogs. To improve the wear strength of the frog, it is provided that a wheel contact surface is provided by explosive plating or electron-beam welding on a base element comprising readily weldable steel.

The use of an austenitic manganese steel for manufacture of weldable parts, in particular in points frogs, is described in DE 28 46 930 C2.

SUMMARY OF THE INVENTION

The problem underlying the present invention is to develop either a process for manufacture of a railroad track part or the part itself such that a connection between rail parts consisting of differing materials in order to manufacture a railroad track part can be achieved without negative effects on the materials to be connected.

The problem is attained in accordance with the invention by means of the process in that carbon steel is used as the first material and high-manganese steel as the second material, the latter being joined to the carbon steel directly by electron-beam welding or indirectly by an intermediate layer comprising a nickel-based alloy, in that the railroad track part thus formed is then heated to a temperature T and held thereat for a period time t such that for high manganese steel solution annealing takes place and for carbon steel austenitizing, and in that the railroad track part is partially quenched after the holding time t at temperature T such that the high manganese steel is available in an austenitic structure and the carbon steel in a mixed structure with at least bainite and pearlite contents.

It is proposed in accordance with the invention that the rail parts consisting of differing materials, one of which is carbon steel and the other austenitic manganese steel, i.e. having a manganese content of at least 10% by weight, preferably in the range between 10 and 20% by weight, be joined either directly using electron-beam welding methods or indirectly via an intermediate layer comprising a nickel-based alloy, with the entire railroad track part then being subjected to selective heat treatment in order to obtain a targeted structure and hence achieve targeted material properties.

The type of join represents a simplification in comparison with the prior art, since in accordance with the invention there is the possibility of joining a rail consisting of austenitic manganese steel directly to the second rail part of carbon steel, in order to then treat the unit thus formed as a whole. The use of electron-beam welding has the advantage of directly joining the austenitic manganese steel to carbon steel. Alternatively, a join can be made using an intermediate layer in the form of a nickel-based alloy.

If nickel-based alloy is used as the intermediate layer, with the nickel content here being at least 60% by weight of the alloy, this has the advantage that the intermediate layer is very ductile and has favourable mechanical properties, without the intermediate layer being negatively affected at the high temperature fluctuations occurring during welding. The result is thus better material properties compared with the special steel used for the intermediate layer according to the prior art, in particular with an austenitic steel, whose properties are well known to depend heavily on the temperature.

In particular, the intermediate layer should contain 70 to 90% by weight of Ni, preferably 75 to 80% by weight of Ni. Particularly favourable material properties are achieved when the intermediate layer contains <0.05% by weight of C, approximately 1% by weight of Mn, and—as necessary—5 to 15% by weight of Cr and <8% by weight of Fe.

In order to weld in simple manner an intermediate layer to the differing materials, it is provided that the intermediate layer is joined to the one material by build-up or flash butt welding and then to the other material by flash butt welding.

Regardless of the type of application, the intermediate layer should have a length of approximately 3 to 15 mm.

In an embodiment of the invention, it is provided that the railroad track part be heated after welding together to $890°$ C.$\leq T \leq 1030°$ C., in particular to $900°$ C.$\leq T \leq 980°$ C. Furthermore, the railroad track part should be kept, over a time t of 0.5 h$\leq t \leq$5 h, preferably 1 h$\leq t \leq$4 h, at the temperature T.

To obtain a targeted structure in the differing materials, the railroad track part should be quenched in a polymer-stabilised bath. Partial quenching can take place here such that the carbon steel has a bainite content of 25% to 50%, preferably 30% to 40%, a pearlite content of at least 40%, preferably at least 50%, and martensite.

The austenitic manganese steel present in the austenitic structure should then be plastically formed by introducing a quasi-static or dynamic force. This can take place in the familiar form by hammering, explosive compaction or blasting with steel balls.

After the plastic formation of the rail part consisting of austenitic manganese steel, the entire railroad track part can be subjected to a further heat treatment such that in carbon steel the martensite and bainite structure contents are tempered and in austenitic manganese steel homogenizing with precipitation hardening takes place.

A railroad track part, in particular a large points part, comprising welded rail parts of differing materials, one of which is a carbon steel and another austenitic manganese steel, with the railroad track part as a whole being subjected to heat treatment, is characterised in that the railroad track part comprises rail parts joined directly by electron-beam welding or via an intermediate layer of nickel-based alloy, of which the carbon steel is in a mixed structure comprising at least bainite with a content $B_1$, pearlite with a content $P_1$ and martensite with a content $M_1$, with $B_1+P_1>>M_1$, and that the austenitic manganese steel is plastically formed with an austenitic structure. A corresponding railroad track part is characterised in particular by a high strength and limit of elasticity.

In particular, it is provided that the bainite content $B_1$ is 30 to 40% and the pearlite content $P_1$ at least 50%, relative to the total volume of the carbon steel.

Furthermore, the heat treatment should be conducted such that the pearlite is in fine-lamellar form.

The carbon steel to be selected is in particular one with a guideline analysis as per grade 900 A or S 1100.

BRIEF DESCRIPTION OF THE DRAWINGS

Further details, advantages and features of the invention are shown not only in the claims and in the features they contain—singly and/or in combination—but also in the following description of a preferred design example shown in the drawing.

In the sole FIGURE, a section of a points part in the area of a frog 10 is shown, comprising a frog point 12 plus connecting rails 14 and 16 to be joined thereto.

DESCRIPTION OF THE PREFERRED EMBODIMENTS

The frog point 12, subjected to heavy loads, can comprise austenitic manganese steel with a manganese content of approximately 10 to 20% by weight. For the connecting rails 14, 16 carbon steel can be used in the usual way, e.g. with a guideline analysis of grade 900 A as per UIC Conditions or S 1100 as per the conditions of BWG Butzbacher Weichenbau GmbH.

In accordance with the invention it is now provided that regardless of the differing materials with the frog point 12 of austenitic manganese steel and connecting rails 14, 16 of carbon steel, either a direct join is made by electron-beam welding or the rail parts 12, 14, 16 are welded with an intermediate layer 18, 20 based on a nickel-based alloy that can have the following analysis (in % by weight):

Ni: 75 to 90%
C: <0.05%
Mn: approximately 1%
where necessary
Cr: 5 to 15%
Fe: <8%

As required, defined proportions of Fe, Ti, S, Mo, Al, Co, Cu, Mb, V, W, Pb, As and/or B can be present.

The use of a nickel-based alloy as the intermediate layer 18, 20 has the advantage that a material is used which is very ductile and has favourable mechanical properties, where even the high temperature fluctuations that can occur during welding to the frog point 12 or to the connecting rails 14, 16 do not lead to any harmful effects.

The nickel-based alloy can be joined by build-up welding or flash butt welding first to one of the rail parts, i.e. either to the connecting rails 14, 16 or to the frog point 12. For flash butt welding, a compact electrode should be used with a cross-sectional geometry matching that of the connected part, i.e. either of the rails 14, 16 or the frog point 12 in the connection area.

The nickel-based alloy should have a layer length of 3 to 15 mm. The intermediate layer 18, 20 thus formed is then joined to the other rail part, i.e. to the frog point 12 or to the connecting rails 14, 16 likewise by welding, in particular by resistance butt welding.

Alternatively there is the possibility of joining the rail parts, i.e. the frog point 12 directly to the connecting rails 14, 16 by electron-beam welding.

After joining of the rail parts to one another, whether by electron-beam welding or with an intermediate layer 18, 20, the complete railroad track part 10 is subjected to a joint heat treatment such that the part is heated to a temperature T of $900°\,C.\leq T\leq 980°\,C.$ and kept at this temperature over a time t of $1\,h\leq t\leq 4$ hours. Partial quenching then follows, preferably in a polymer-stabilised bath such that the carbon steel, i.e. in the design example the connecting rails 14, 16, has a bainite content of about 30 to 40%, a pearlite content of at least 50% and furthermore martensite as the remainder, with the pearlite being present in fine-lamellar form.

The austenitic manganese steel can then be plastically formed by introducing a quasi-static or dynamic force, with known techniques such as explosive compaction, hammering or blasting with steel balls being possible measures for introducing such force.

Finally, the entire component can be subjected to a further heat treatment to achieve tempering of the martensite and bainite structure contents for the carbon steel, and homogenizing with precipitation hardening by highly disperse cementite contents for the austenitic manganese steel.

What is claimed is:

1. A process for manufacture of a railroad track part, comprising a first part made of carbon steel and a second part made of austenitic manganese steel, comprising the steps of:
    joining the austenitic manganese steel part to the carbon steel by a process step of
        1) directly joining the first and second parts by electron beam welding, or
        2) indirectly joining the first and second parts by disposing therebetween an intermediate layer comprising a nickel-based alloy, and welding the first and second parts together;
    heating the first and seconds parts thus joined as a unit to a temperature T, and holding at temperature T for a time t sufficient to result in the austenitic manganese steel solution annealing and the carbon steel austenitizing; and
    partially quenching the joined and heated first and second parts after the holding time t at temperature T such that the austenitic manganese steel is provided in an austenitic structure and the carbon steel is in a mixed structure with at least bainite and pearlite contents.

2. A process according to claim 1, wherein said first and second parts are joined by electron beam welding and after said welding, the joined parts are heated to $890°\,C.\leq T\leq 1030°\,C.$ 3. A process according to claim 1, wherein $900°\,C.\leq T\leq 980°\,C.$ 4. A process according to claim 1, wherein $0.5\,h\leq t\leq 5\,h.$ 5. A process according to claim 1, wherein $1\,h\leq t\leq 4\,h.$ 6. A process according to claim 1, wherein the quenching takes place in a polymer-stabilized bath.

7. A process according to claim 1, wherein the partial quenching results in the carbon steel having a bainite content of 25% to 50%, a pearlite content of at least 40%, and a martensite content.

8. A process according to claim 7, wherein the bainite content is 30% to 40% by volume and the pearlite content is at least 50% by volume.

9. A process according to claim 1, additionally comprising plastically forming the austenitic manganese steel present in the austenitic structure by introducing a quasi-static or dynamic force.

10. A process according to claim 9, additionally comprising after said plastically forming, subjecting the railroad track part to a further heat treatment sufficient that in the carbon steel the martensite and bainite structure contents are tempered and in the austenitic manganese steel homogenizing with precipitation hardening takes place.

11. A process according to claim 1, wherein the nickel-based alloy contains at least 60% by weight nickel.

12. A railroad track part comprising a first rail part formed of carbon steel welded to a second rail part formed of austenitic manganese steel, said rail parts being joined
   1) directly by electron beam welding, or
   2) indirectly, via an intermediate layer of a nickel-based alloy disposed therebetween, wherein the carbon steel in the railroad track part is in a mixed structure comprising at least bainite with a content $B_1$, pearlite with a content $P_1$ and martensite with a content $M_1$, with $B_1+P_1>>M_1$, wherein $B_1$ is 25% to 50%, and $P_1$ is greater than 50%, relative to total volume of the carbon steel, and wherein the austenitic manganese steel in the railroad track part is plastically formed and has an austenitic structure.

13. A railroad track part according to claim 12, wherein $B_1$ is 30% to 40%.

14. A railroad track part according to claim 12, wherein the pearlite is present in fine-lamellar form.

15. A railroad track part according claim 12, wherein the carbon steel has a guideline analysis as per grade 900 A or S 1100.

16. A railroad track part according claim 12, which is a large points part.

17. A railroad track part according claim 16, comprising connector rails and a frog point.

18. A railroad track part according claim 12, wherein the nickel-based alloy contains at least 60% by weight nickel.

* * * * *